Figure 1:
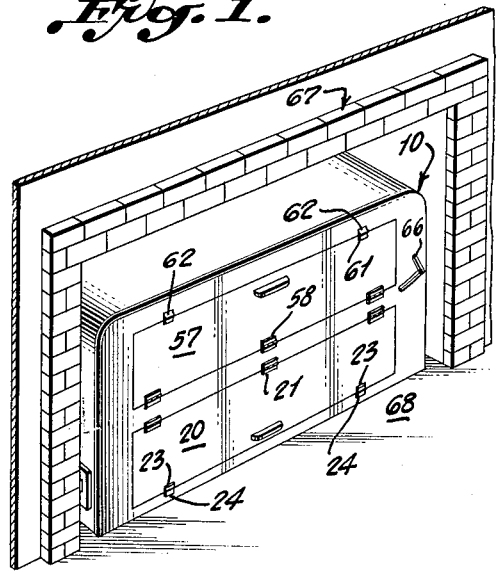

April 30, 1963 A. C. GANNON 3,087,414
STATIONARY OR PORTABLE COOKING OVEN
Filed June 22, 1961 2 Sheets-Sheet 1

INVENTOR
ALFRED C. GANNON
BY
ATTORNEY

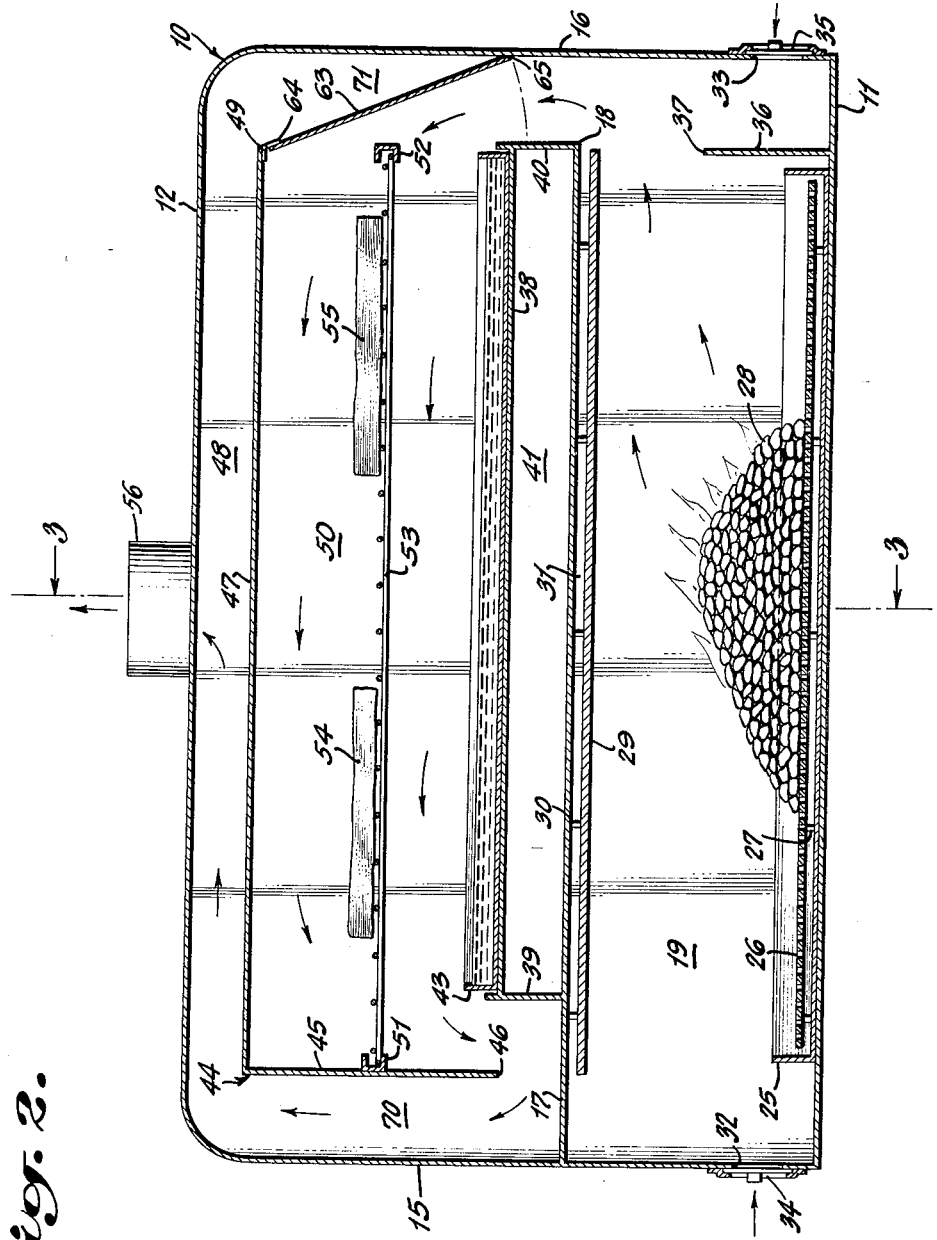

United States Patent Office 3,087,414
Patented Apr. 30, 1963

3,087,414
STATIONARY OR PORTABLE COOKING OVEN
Alfred C. Gannon, Abilene, Tex.
(P.O. Box 12302, Dallas 25, Tex.)
Filed June 22, 1961, Ser. No. 118,821
2 Claims. (Cl. 99—259)

This invention relates to cooking apparatus and more particularly to a stationary or portable cooking oven which may be conveniently utilized in the conventional fireplace of a dwelling, or by the use of detachable legs, may be conveniently used out of doors for the preparation of food, such as steaks, hamburgers or for barbecuing operations.

Outdoor barbecues or grills are more or less common, but many of these merely include an open top pan which serves to receive the fuel, such as charcoal, and above the pan is disposed a food supporting grid or grill which may or may not be adjustable with respect to the fire. Much of the heat developed in a cooking device of this type is dissipated to the atmosphere and furthermore, the grease or other drippings from the food products being prepared drop into the fire which, in the case of grease, causes the fire to periodically flare up and die down, thus providing an uneven heat and furthermore, the drippage from the food products causes the ashes to form a more or less sticky or hard mass thereby rendering the ash removal operation difficult and disagreeable. The lack of uniform heat applied to the food products, as well as the excessive loss of heat to the atmosphere renders the proper preparation of food products in this type of grill exceedingly difficult and furthermore, the common type of grill now in general use is only suitable for use out of doors and cannot be utilized indoors, as by placing the same in a conventional fireplace. Likewise, the prior art barbecues or grills make no provision for recovering the juices or drippage from the food products thereby precluding use of the same for increasing the enjoyment of the food and these devices also require the use of long handle implements in order to avoid subjecting the hands or person of the user to excessive heat.

It is accordingly an object of the invention to provide a stationary or portable cooking oven which may be conveniently utilized in the conventional fireplace of a dwelling in which case products of combustion will pass into the flue of the fireplace thereby providing a convenient means for charcoal or other broiling of food products in the home.

A further object of the invention is the provision of a stationary or portable cooking oven which may be conveniently utilized in the conventional fireplace of a dwelling to provide indoor barbecue cooking or by the application of detachable legs may be conveniently utilized out of doors.

A still further object of the invention is the provision of a stationary or portable cooking oven in which charcoal or other suitable fuel may be utilized and in which the products of combustion may be selectively directed into intimate contact with the food product to be prepared or conducted directly to a vent or smoke outlet for dissipation to the atmosphere.

Another object of the invention is the provision of a stationary or portable cooking oven which is completely enclosed and is provided with convenient access doors thereby preventing excessive heat dissipation to the atmosphere and utilizing substantially all of the products of combustion for cooking purposes.

A further object of the invention is the provision of a stationary or portable cooking oven in which a removable ash pan is provided and also a removable grate positioned in the ash pan to facilitate removal of ashes and cleaning of the device.

A still further object of the invention is the provision of a stationary or portable cooking oven utilizing charcoal or other suitable fuel and in which means is provided for preventing excessive heating of the metal parts of the oven in order to prevent burn-out thereof.

Another object of the invention is the provision of a stationary or portable cooking oven in which a removable drip pan is provided, which pan may serve to receive water, if desired, and which may be conveniently removed to permit utilization of the drippings for any desired purpose.

A further object of the invention is the provision of a stationary or portable cooking oven which is separated into a firebox and a cooking chamber by suitable baffles and in which a removable food supporting grid is provided in the cooking chamber to permit turning or other handling of the food products without subjecting the user to excessive heat and also to facilitate cleaning of the device.

A still further object of the invention is the provision of a stationary or portable cooking oven divided into a firebox and a cooking chamber and in which means is provided for controlling the flow of draft air to the firebox.

Another object of the invention is the provision of a stationary or portable cooking oven which may be conveniently and economically manufactured from readily available materials, the major portion of the oven being constructed from suitable sheet metal, the design of the oven being such as to prevent excessive heating in concentrated areas, thereby permitting the use of relatively thin sheet metal for construction of the device.

Figure 2:
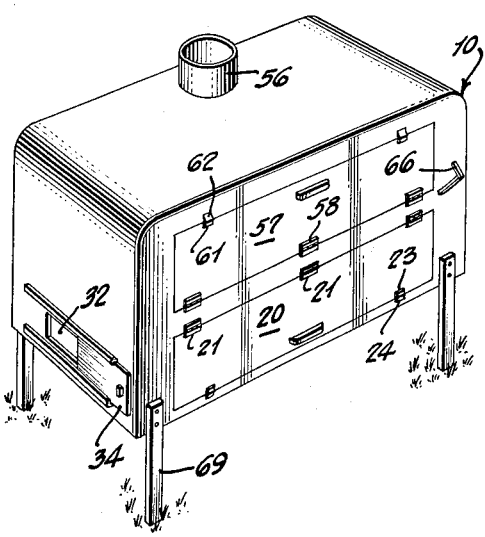
Figure 3:
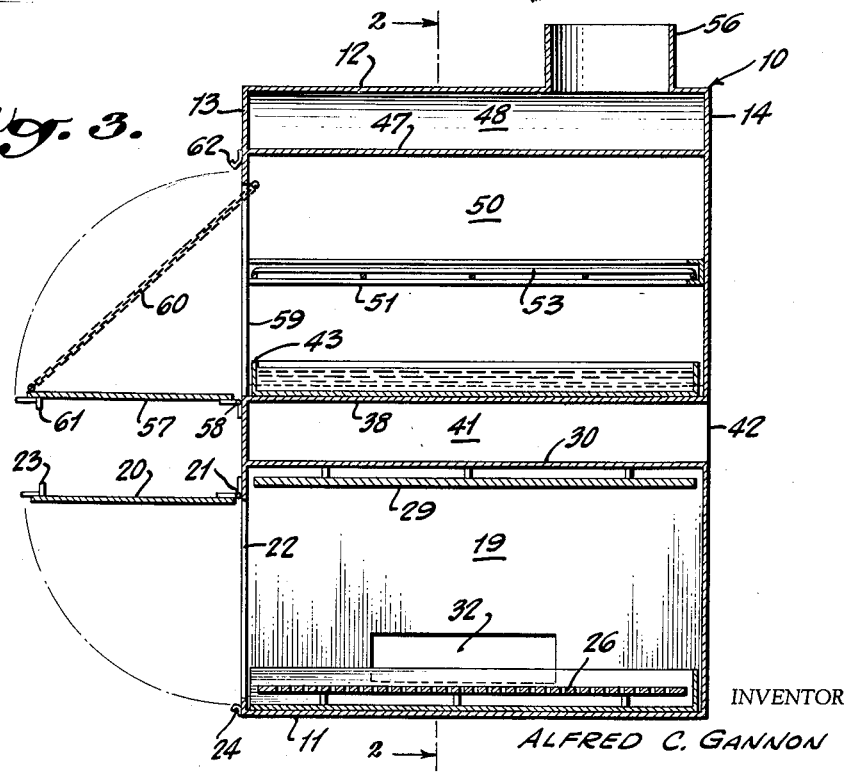

Further objects and advantages of the invention will be apparent from the following description taken in conjunction with the accompanying drawings wherein:

FIG. 1 is a view in perspective showing a cooking oven constructed in accordance with this invention positioned in a conventional fireplace to permit indoor cooking;

FIG. 2 a sectional view taken substantially on the line 2—2 of FIG. 3 and showing the internal structure of the cooking oven of this invention, as well as the path of flow of the draft air and the products of combustion;

FIG. 3 a sectional view taken substantially on the line 3—3 of FIG. 2 and further showing the internal structure of the device; and FIG. 4 a view in perspective showing the cooking oven of this invention with the detachable legs applied thereto for outdoor cooking application.

With continued reference to the drawings, there is shown a stationary or portable cooking oven 10 constructed in accordance with this invention and which may well comprise a housing having a bottom wall 11, a top wall 12, front and rear walls 13 and 14, respectively, and end walls 15 and 16 providing a generally rectangular hollow structure. A partition 17 is secured to the front and rear walls 13 and 14, as well as to the end wall 15 at a point intermediate the height of the oven 10 and the partition 17 terminates in a free edge 18 spaced from the end wall 16 as clearly shown in FIG. 2.

The partition 17 serves to provide a firebox 19 between the partition 17 and the bottom wall 11 and a door 20 is hingedly mounted at 21 on the front wall 13 and serves to open or close an opening 22 in the front wall 13 to provide convenient access to the firebox 19. A suitable catch 23 may be provided on the door 20 for engaging a cooperating member 24 on the front wall 13 to releasably hold the door 20 in closed position. An ash pan 25 is removably supported on the bottom wall 11 within the firebox 19 and removably disposed in the ash pan 25 is a grate 26 which may be supported on legs 27 above the bottom of the ash pan 25 and charcoal or other fuel 28 may be suitably distributed on the grate 26. The grate 26 facilitates proper burning of the fuel 28 and also facilitates the separation of any unburned fuel from the ashes in the bottom of the pan 25 after use of the apparatus. Since there is an appreciable concentration of heat directly above the fuel 28 in the ash pan 25 in order to prevent excessive heating or burning of the partition 17, there may be provided a heat deflecting baffle 29 in the form of a relatively heavy metal plate secured to the underside of the partition 17 by suitable spacing members or struts 30 which serve to provide an air space 31 between the baffle 29 and the partition 17 thereby maintaining the partition 17 in a relatively cool condition and preventing burn-out thereof.

In order to provide for proper burning of the fuel 28, there may be provided a draft inlet opening 32 in the lower part of the end wall 15 and a similar draft inlet opening 33 in the lower part of the end wall 16. The flow of draft air through the inlet opening 32 may be controlled by a slide damper or other suitable damper 34 and in a similar manner, the flow of draft air through the inlet opening 33 may be controlled by a slide damper or other suitable damper 35. An upwardly projecting baffle 36 may be provided in the firebox 19 spaced from the end wall 16 and disposed substantially below the free edge 18 of the partition 17 with the baffle 36 extending between the front and rear walls 13 and 14, respectively, to form a lower portion of flow passage 71 and providing an opening 37 thereto for the passage of products of combustion from the firebox 19 around the free edge of the partition 17 as shown by the arrows in FIG. 2.

A shelf 38 is supported above the partition 17 in spaced relation thereto by plates 39 and 40, it being noted that the plate 39 is disposed in spaced relation to the end wall 15 and the plate 40 is substantially in alignment with the free edge 18 of the partition 17. The shelf 38 extends between the front and rear walls 13 and 14 and, together with the plates 39 and 40 and the partition 17, provides a space 41 which communicates with the atmosphere through an opening 42 in the rear wall 14 thereby precluding undue heating of the shelf 38 and also further contributing to adequate cooling of the partition 17. The shelf 38 also serves to removably support a water or drip pan 43 and for certain types of cooking it may be desired to partially fill this pan with water and for other types of cooking it may be desirable to use the pan 43 merely to collect drippings from the food products disposed there above in a manner to be presently described.

A generally L-shaped baffle is disposed in the oven 10 above the partition 17 with the baffle 44 extending between the front and rear walls 13 and 14 respectively and with the leg 45 of the baffle 44 disposed substantially midway between the plate 39 at one end of the shelf 38 and the end wall 15 and terminating at a point 46 above the partition 17. The other portion 47 of the baffle 44 extends horizontally in spaced relation to the top wall 12 to provide a smoke passage 48 between the portion 47 of the baffle 44 and the top wall 12 and with the free end 49 of the portion 47 of the baffle 44 terminating in spaced relation to the end wall 16 and substantially in alignment with the free edge 18 of the partition 17. The baffle 44 in conjunction with the partition 17 and shelf 38 serves to provide a cooking chamber 50 and removably disposed in such cooking chamber 50 on suitable supports 51 and 52 is a food supporting grid or grill 53 which is entirely conventional in structure and may receive one or more pieces of food 54 and 55 on the top surface thereof. A smoke outlet 56 is provided in the top wall 12 communicating with the smoke passage 48 and a door 57 is hingedly mounted at 58 on the front wall 13 to open or close an opening 59 in the front wall 13 to provide access to the cooking chamber 50 or to the drip pan 43. The door 57 may be supported when in open position as shown in FIG. 3, by a suitable flexible member, such as a chain 60 and it is to be noted that in this position the door 57 may, if desired, be utilized as a shelf. A catch 61 may be provided on the door 57 for engaging a cooperating member 62 on the front wall 13 to retain the door 57 in closed position.

A damper in the form of a plate 63 may be hingedly mounted at 64 on the free end 49 of the baffle 44 and the lower edge 65 of the baffle plate 63 is movable between the end wall 16 as shown in full lines in FIG. 2, to a position engaging the plate 40 extending upwardly from the free edge 18 at the partition 17. The baffle plate 63 may be conveniently operated from the exterior of the oven 10 by a suitable hand engaging lever 66 or by any other suitable means.

As shown in FIG. 1, the cooking oven 10 may be conveniently positioned within a conventional fireplace 67 with the bottom wall 11 of the oven 10 supported on the hearth or floor 68 of the fireplace and this permits convenient use of the device indoors and, of course, in this application the smoke outlet 56 is positioned beneath the flue of the fireplace and the products of combustion escape to the atmosphere through such flue.

When it is desired to utilize the oven 10 of this invention for outdoor cooking, detachable legs 69 may be secured to the front and rear walls 13 and 14 adjacent to the corners of the housing or if desired, such legs may, of course, be secured to the end walls 15 and 16. Any suitable means for detachably securing the legs 69 in place may be utilized.

In the use of the cooking oven of this invention as shown in FIG. 2, the products of combustion from the fuel 28 will flow from the firebox 19 through the space 37 between the upper end of the baffle 36 and the free edge 18 of the partition 17 and with the damper plate 63 positioned as shown in full lines in FIG. 2, the products of combustion will be directed into and through the cooking chamber 50 to pass over and in intimate contact with the food products 54 and 55 disposed on the grid or grill 23 and from the cooking chamber 50, the products of combustion will pass between the lower edge 46 of the leg 45 of the baffle 44 and the partition 17 and upwardly through a channel 70 to the smoke passage 48 from which the products of combustion will escape to the atmosphere through the smoke outlet 56. In the event it is desired to exclude the products of combustion from the cooking chamber 50 to permit cooling of the same or while manipulating the food products therein, it is only necessary to move the damper plate 63 from the position shown in full lines in FIG. 2 to a position with the lower end 65 of the damper plate 63 in engagement with the plate 40 at the free edge 18 of the partition 17, at which time the products of combustion will pass upwardly through the canal or duct 71 to the smoke passage 48 from which the same will escape to the atmosphere through the smoke outlet 56. The combustion of the fuel 28 may be, of course, controlled by suitable manipulation of the dampers 34 and 35 on the draft inlet openings 32 and 33.

It will be seen that by the above described invention there has been provided a relatively simple, yet highly efficient and usable stationary or portable cooking oven and in which the ash pan, as well as the drip pan and food supporting grid or grill are easily accessible and removable through doors in the front wall of the device which serve to facilitate cleaning of the same and also the application of heat to the food products may be conveniently controlled by an externally operated damper. By reason of the particular structure of the device which minimizes localized heating relatively thin sheet metal or other suitable material may be utilized in the construction thereof, thereby reducing the cost as well as the weight of the same.

It should be pointed out that the water pan 43 accomplishes two advantageous objectives. First, it maintains a high relative humidity around the meat being cooked and thus makes the meat more palatable, and, second, water evaporation and relatively high humidity cause the meat to remain moist, thereby absorbing more of a smoke flavor from the fuel.

It should also be noted that turning of the product to obtain even temperature on both sides is not necessary because the heat and the smoke pass over the bottom and top of the product.

In addition to the above advantages, constant attention is not necessary due to the passage of heat and smoke over the product and the elimination of fire flare up, which normally is caused by dripping grease.

It will be obvious to those skilled in the art that various changes may be made in the invention without departing from the spirit and scope thereof, and, therefore, the invention is not limited by that which is shown in the drawings and described in the specification, but only as indicated in the appended claims.

What is claimed is:

1. A portable cooking oven constructed entirely of metal, having a substantially flat bottom wall and top wall with substantially vertical front, rear and end walls providing a generally rectangular chamber, a flat partition member mounted intermediate the height of said chamber and extending between said front and rear walls and from one end wall and having a free edge disposed near but spaced from the opposite end wall and providing a firebox between said partition member and said bottom wall and a space adjacent said opposite end wall forming a flue, a door in said front wall providing access to said firebox, an ash pan removably supported on said bottom wall within said firebox, a removable grate disposed in said ash pan, a relatively heavier baffle plate fixed to the under side of said partition member in vertically spaced relation thereto, an upwardly projecting baffle on said bottom wall extending between said front and rear walls and positioned near but in spaced relation to said opposite end wall and having an upper edge terminating in vertically spaced relation to said free edge of said partition member and in vertical alignment therewith to provide a flue opening, a shelf disposed in spaced and parallel relation above said partition member and extending between said front and rear walls and terminating adjacent the said free edge of said partition member and at its opposite end in spaced relation to said one end wall, vertical and parallelly spaced plates integral with said partition member extending between said front and rear walls and between the ends of said shelf and said partition member to provide an elongated shallow chamber therebetween, said elongated chamber being open to the atmosphere through said rear wall, a relatively shallow water pan covering substantially the entire extent of said shelf and removably supported on said shelf and adapted to provide high humidity conditions in said oven when in use, a generally L-shaped baffle member extending between said front and rear walls between said shelf and said top wall with one leg of said last-named baffle vertically disposed substantially midway between said shelf and said one end wall and depending to a point substantially in alignment with said shelf to form with said one end wall a vertical passage, the free end of the other leg of said last-named baffle being substantially in alignment with the free edge of said partition member, said last-named baffle and said shelf providing a cooking chamber therebetween, said vertical passage communicating at its lower end with said cooking chamber, a food supporting grid removably disposed in said cooking chamber and parallelly spaced above said shelf, said last-named baffle and said top wall providing a generally horizontal smoke passage, said vertical passage communicating at its upper end with said smoke passage, said top wall having a smoke outlet communicating with said smoke passage, a door in said front wall providing access to said cooking chamber and a damper means comprising a plate pivotally mounted on the free end of said other leg of said L-shaped baffle and adjustably movable between said opposite end wall and said vertical plate at the said free edge of said partition member, whereby with said damper engaging said opposite end wall the products of combustion will flow from said firebox around the free edge of said partition member, through said cooking chamber, around the lower edge of said vertical leg of said L-shaped baffle to said vertical passage and said smoke passage and to said smoke outlet, and with said damper engaging said plate at the free edge of said partition member the products of combustion will flow from said firebox directly to said smoke passage.

2. A cooking oven as defined in claim 1, in which said end walls are provided with air inlet openings adjacent said bottom wall and communicating with said firebox, dampers for respectively controlling the flow of air through said inlet openings, said oven being provided with detachable legs for supporting the entire structure above a supporting surface, said oven with said legs detached therefrom being adapted for positioning within a conventional fire place.

References Cited in the file of this patent

UNITED STATES PATENTS

| | | |
|---|---|---|
| 1,294,528 | Olsen | Feb. 18, 1919 |
| 2,095,745 | Hiatt | Oct. 12, 1937 |
| 2,224,945 | Arnes | Dec. 17, 1940 |
| 2,350,948 | Walker | June 6, 1944 |